(No Model.)
W. M. WHITING.
BELT FASTENER.
No. 471,285. Patented Mar. 22, 1892.
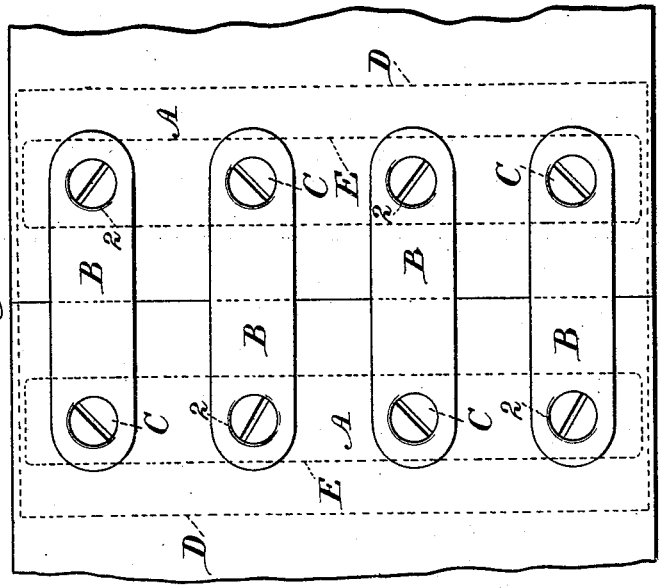
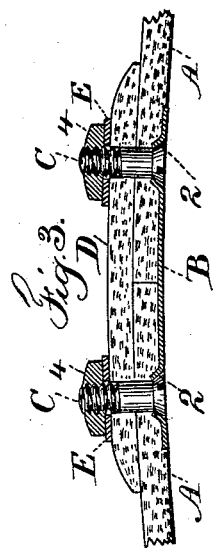
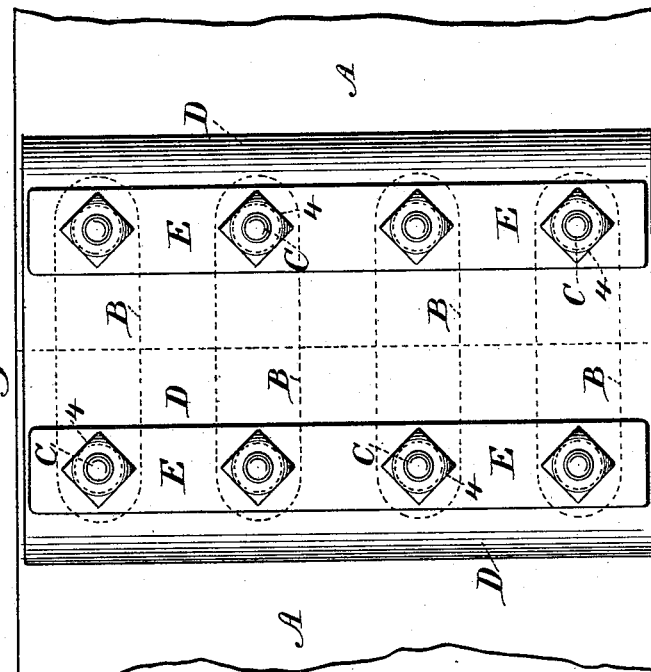
Witnesses
Chas. H. Smith
J. Staib
Inventor
William M. Whiting
Per Lemuel W. Serrell
Atty

UNITED STATES PATENT OFFICE.

WILLIAM M. WHITING, OF ORANGE, NEW JERSEY.

BELT-FASTENER.

SPECIFICATION forming part of Letters Patent No. 471,285, dated March 22, 1892.

Application filed August 8, 1891. Serial No. 402,085. (No model.)

*To all whom it may concern:*

Be it known that I, WILLIAM M. WHITING, a citizen of the United States, residing at Orange, in the county of Essex and State of New Jersey, have invented an Improvement in Belt-Fasteners, of which the following is a specification.

The object of this invention is to strengthen the fastening between the ends of a leather or other belt and at the same time to render such fastening flexible and not liable to slip upon the pulley. Metallic plates have been made use of, secured by rivets to the ends of the belt, and also metallic strips have extended from one end to the other of the belt and been bent around and clinched in the form of hooks, and in some instances lapping plates have been applied over the joint.

My invention relates to the peculiarities of construction and combination hereinafter set forth and claimed.

In the drawings, Figure 1 is a plan view of the belt with my improvement applied thereon. Fig. 2 shows the reverse side of the belt, and Fig. 3 is a section at the line $x$ $x$.

The belt A is to be either of leather or woven material, and upon one side of the belt I make use of the spring-plates B, extending across from one part of the belt to the other, and these spring-plates are to be sufficiently numerous to afford a strength equal, or nearly so, to the tensile strength of the belt, and these plates are preferably of tempered steel, so that they will yield in passing around the pulley. The plates are to be applied at the inner or pulley side of the belt, and the bolts C pass through these plates and through the belt and are provided with nuts or rivet heads at the opposite side of the belt.

Plates have heretofore been employed upon the outer side of the belt, the rivet-heads and nuts extending above the same. In consequence of applying these plates at the pulley side of the belt the sheet metal is to be struck up in the form of conical recesses around the bolt-holes, as seen at 2, so that the bolt-heads do not project, and the metal of these conical recesses is embedded into the belt and aids in firmly clamping the same. At the opposite side of the belt a lap of leather or similar material is applied at D, the same being sufficiently large for the bolts C to pass through the same, and this lap being of leather, rawhide, or similar material is flexible and slightly elastic, so that the strength of the fastening is augmented without the belt being rendered too rigid at the joint, and with woven belts especially it is advantageous to apply the transverse spring-plates E, resting upon the lap D and between the same and the nuts 4 of the bolts C, such transverse spring-plates being perforated for the passage of the bolts.

By this construction a very firm belt-fastening is made, possessing the requisite elasticity and strength, and the risk of slipping upon the pulley is reduced to a minimum, because the spring-plates B become embedded, or nearly so, into the under side of the belt.

I claim as my invention—

1. The combination, in a belt-fastening, with the screw-bolts having conical heads and passing through the belt into nuts at the other side, of metallic spring-plates, each plate having holes near the ends with the adjacent metal stamped up conically to receive and contain the conical bolt-heads, whereby the metallic connections of the belt are adapted to be embedded into the material of the belt, substantially as set forth.

2. The combination, in a belt-fastening, of spring-plates extending across from one end of the belt to the other and having countersunk recesses, bolts passing through the spring-plates and through the belt and having heads within the recesses, a lap of leather on the outer surface of the belt and through which the bolts pass, transverse spring-plates upon the surface of the lap and through which the bolts pass, and nuts for clamping the parts, substantially as set forth.

3. The combination, in a belt-fastening, of metallic spring-plates having holes near the ends with the adjoining metal stamped up to form conical recesses, screw-bolts with conical heads fitting the recesses, a lap of leather or similar material for the outer side of the belt and covering the joint, the bolts passing through the belt and through the lap, and nuts for clamping the parts firmly together, substantially as set forth.

Signed by me this 30th day of July, A. D. 1891.

WILLIAM M. WHITING.

Witnesses:
ROBERT E. WOODRUFF,
THOMAS S. CRANE.